(12) United States Patent
Jeong et al.

(10) Patent No.: US 9,406,976 B2
(45) Date of Patent: Aug. 2, 2016

(54) ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Myung-Hwan Jeong, Yongin-si (KR); Woo-Cheol Shin, Yongin-si (KR); Sang-Il Han, Yongin-si (KR); Jung-Yi Yu, Yongin-si (KR); Myung-Hoon Kim, Yongin-si (KR); Tae-Hyun Bae, Yongin-si (KR); Moon-Sung Kim, Yongin-si (KR); Min-Ju Lee, Yongin-si (KR); Sang-Geun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 544 days.

(21) Appl. No.: 13/831,606

(22) Filed: Mar. 15, 2013

(65) Prior Publication Data
US 2014/0178772 A1     Jun. 26, 2014

(30) Foreign Application Priority Data
Dec. 24, 2012    (KR) .................. 10-2012-0152462

(51) Int. Cl.
| | | |
|---|---|---|
| *H01M 10/0569* | (2010.01) | |
| *H01M 10/0525* | (2010.01) | |
| *H01M 10/052* | (2010.01) | |
| *H01M 10/0567* | (2010.01) | |

(52) U.S. Cl.
CPC ........ *H01M 10/0569* (2013.01); *H01M 10/052* (2013.01); *H01M 10/0525* (2013.01); *H01M 10/0567* (2013.01); *H01M 2300/0034* (2013.01); *H01M 2300/0037* (2013.01); *Y02E 60/122* (2013.01)

(58) Field of Classification Search
CPC ..................... H01M 10/0569; H01M 10/0567; H01M 10/052; H01M 10/0525; H01M 2300/0034; H01M 2300/0037; Y02E 60/122
See application file for complete search history.

(56) References Cited

U.S. PATENT DOCUMENTS

| | | | |
|---|---|---|---|
| 7,229,718 B2 | 6/2007 | Yamaguchi et al. | |
| 2011/0008681 A1 | 1/2011 | Koh et al. | |
| 2012/0183842 A1* | 7/2012 | Kawasaki | H01M 10/052 429/163 |
| 2014/0017572 A1* | 1/2014 | Uehara | H01M 10/052 429/326 |

FOREIGN PATENT DOCUMENTS

| | | | |
|---|---|---|---|
| JP | 2001-052737 | | 2/2001 |
| JP | 4380664 B2 | | 10/2009 |
| JP | 4433701 B2 | | 1/2010 |
| KR | 10-2004-0018096 | | 3/2004 |
| KR | 10-2010-0066549 | | 6/2010 |
| WO | WO 2011/040443 | * | 4/2011 |
| WO | WO 2012/132060 | * | 10/2012 |
| WO | WO 2012/132976 | * | 10/2012 |

OTHER PUBLICATIONS

WO 2012132976 abstract to show US 2014/0017572 are in the same family. No date.*
WO 2012132060 abstract to show that WO 2012132976 and US 2014/0017572 are in the same family. No date.*
Patent Abstracts of Japan and English Machine Translation of JP 4380664 B2, 18 pages.
Patent Abstracts of Japan and English Machine Translation of JP 4433701 B2, 18 pages.

* cited by examiner

*Primary Examiner* — Laura Weiner
(74) *Attorney, Agent, or Firm* — Lewis Roca Rothgerber Christie LLP

(57) ABSTRACT

An electrolyte for a rechargeable lithium battery that includes a lithium salt and a non-aqueous organic solvent, wherein the non-aqueous organic solvent includes a fluoro-based solvent represented by the following Chemical Formula 1, and a rechargeable lithium battery including the same.

R—O—R'     Chemical Formula 1

In Chemical Formula 1, R and R' are independently a substituted or unsubstituted C1 to C6 alkyl group, or a substituted or unsubstituted C1 to C6 fluoroalkyl group, wherein at least one of R and R' is the substituted or unsubstituted C1 to C6 fluoroalkyl group, and a substitution ratio of fluoro in the fluoro-based solvent represented by the Chemical Formula 1 may range from more than about 0% to less than or equal to about 50%.

11 Claims, 12 Drawing Sheets

L1:Leakage, L2:Heat emission at more than 250°C,
L3:Heat emission at more than 350°C, L4:Fire, L5:Explosion L5
Comparative
Example1

L1
Example5

L1:Leakage, L2:Heat emission at more than 250°C,
L3:Heat emission at more than 350°C, L4:Fire, L5:Explosion

ELECTROLYTE FOR RECHARGEABLE LITHIUM BATTERY AND RECHARGEABLE LITHIUM BATTERY INCLUDING THE SAME

RELATED APPLICATION

This application claims priority to and the benefit of Korean Patent Application No. 10-2012-0152462 filed in the Korean Intellectual Property Office on Dec. 24, 2012, the entire content of which is incorporated herein by reference.

BACKGROUND

1. Field

This following description relates to an electrolyte for a rechargeable lithium battery and a rechargeable lithium battery including the same.

2. Description of the Related Art

Rechargeable lithium batteries have recently drawn attention as a power source for small portable electronic devices. The rechargeable lithium batteries use an organic electrolyte and thereby, have discharge voltages that are two or more times higher than that of conventional batteries using an alkali aqueous solution and accordingly, have high energy density.

The rechargeable lithium batteries are used by injecting an electrolyte into a battery cell including a positive electrode including a positive active material (that may intercalate and deintercalate lithium) and a negative electrode including a negative active material (that may intercalate and deintercalate lithium).

The electrolyte may be prepared by dissolving a lithium salt in an organic solvent but limit battery performance when a lithium ion battery is allowed to stand at a high temperature.

Comparatively, a comparative electrolyte for a rechargeable lithium battery has included a cyclic ester such as ethylene carbonate, propylene carbonate, or the like, a linear ester such as dimethyl carbonate, propionic acid ether, or the like, a cyclic ether such as tetrahydrofuran or the like. However, the comparable electrolyte did not satisfy both safety and long-term charge-discharge cycle-life characteristics.

In order to accomplish the long-term charge-discharge cycle-life characteristics of a rechargeable lithium battery, an electrolyte including an organic fluoro ether compound having excellent safety against oxidation decomposition has been recently suggested.

The organic fluoro ether compound includes fluoro in a high amount and thus, high safety against oxidation decomposition but this deteriorates the cycle-life characteristics (capacity retention) due to high viscosity of the utilized fluoro-based solvent.

SUMMARY

Aspects of embodiments of the present invention are directed toward an electrolyte for a rechargeable lithium battery having high safety and simultaneously high rate capability and improved cycle-life characteristics.

Aspects of embodiments of the present invention are directed toward a rechargeable lithium battery including the electrolyte.

According to one embodiment of the present invention, provided is an electrolyte for a rechargeable lithium battery that includes a lithium salt and a non-aqueous organic solvent, wherein the non-aqueous organic solvent includes a fluoro-based solvent represented by the following Chemical Formula 1.

 Chemical Formula 1

In Chemical Formula 1,

R and R' are independently a substituted or unsubstituted C1 to C6 alkyl group, or a substituted or unsubstituted C1 to C6 fluoroalkyl group, wherein at least one of R and R' is the substituted or unsubstituted C1 to C6 fluoroalkyl group, and a substitution ratio of fluoro in the fluoro-based solvent represented by the Chemical Formula 1 may range from more than about 0% to less than or equal to about 50%.

The substitution ratio of fluoro in the fluoro-based solvent represented by the Chemical Formula 1 may range from more than or equal to about 5% to less than or equal to about 30%.

The substitution ratio of fluoro in the fluoro-based solvent represented by the Chemical Formula 1 may range from more than or equal to about 10% to less than or equal to about 20%.

The fluoro-based solvent may include at least one of compounds represented by the following Chemical Formulae 2 to 7.

 Chemical Formula 2

 Chemical Formula 3

 Chemical Formula 4

 Chemical Formula 5

 Chemical Formula 6

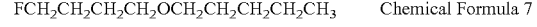 Chemical Formula 7

The fluoro-based solvent may be included in an amount of about 15 volume % to about 45 volume % based on the total amount of the non-aqueous organic solvent.

The electrolyte may further include a flame retardant.

The flame retardant may include at least one selected from a phosphazene compound and a phosphoric acid ester compound.

The flame retardant may be the phosphazene compound, and the phosphazene compound may include a compound represented by the following Chemical Formula 8.

Chemical Formula 8

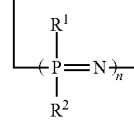

In Chemical Formula 7, n is 3 or 4, $R^1$ and $R^2$ are the same or different and F, $NR^3R^4$, or a substituted or unsubstituted C1 to C5 alkoxy group, $R^3$ and $R^4$ are the same or different and a substituted or unsubstituted C1 to C30 alkyl group, a substituted or unsubstituted C3 to C30 cycloalkyl group, a substituted or unsubstituted C2 to C30 alkenyl group, or a substituted or unsubstituted C6 to C30 aryl group.

The phosphazene compound may be a compound represented by the following Chemical Formula 9 or the following Chemical Formula 10.

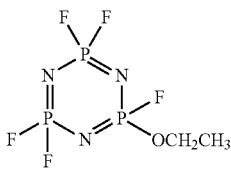

Chemical Formula 9

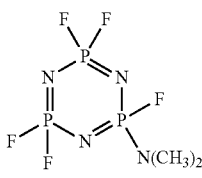

Chemical Formula 10

The flame retardant may be included in an amount of about 1 part by weight to about 20 parts by weight and specifically, about 5 parts by weight to about 10 parts by weight based on 100 parts by weight of the non-aqueous organic solvent.

According to another embodiment of the present invention, a rechargeable lithium battery including the electrolyte, a positive electrode including a positive active material, and a negative electrode including a negative active material is provided.

Other embodiments of the present invention are described in the following detailed description.

The rechargeable lithium battery has high safety and simultaneously, high rate capability and improved cycle-life characteristics.

DETAILED DESCRIPTION

Figure 1:
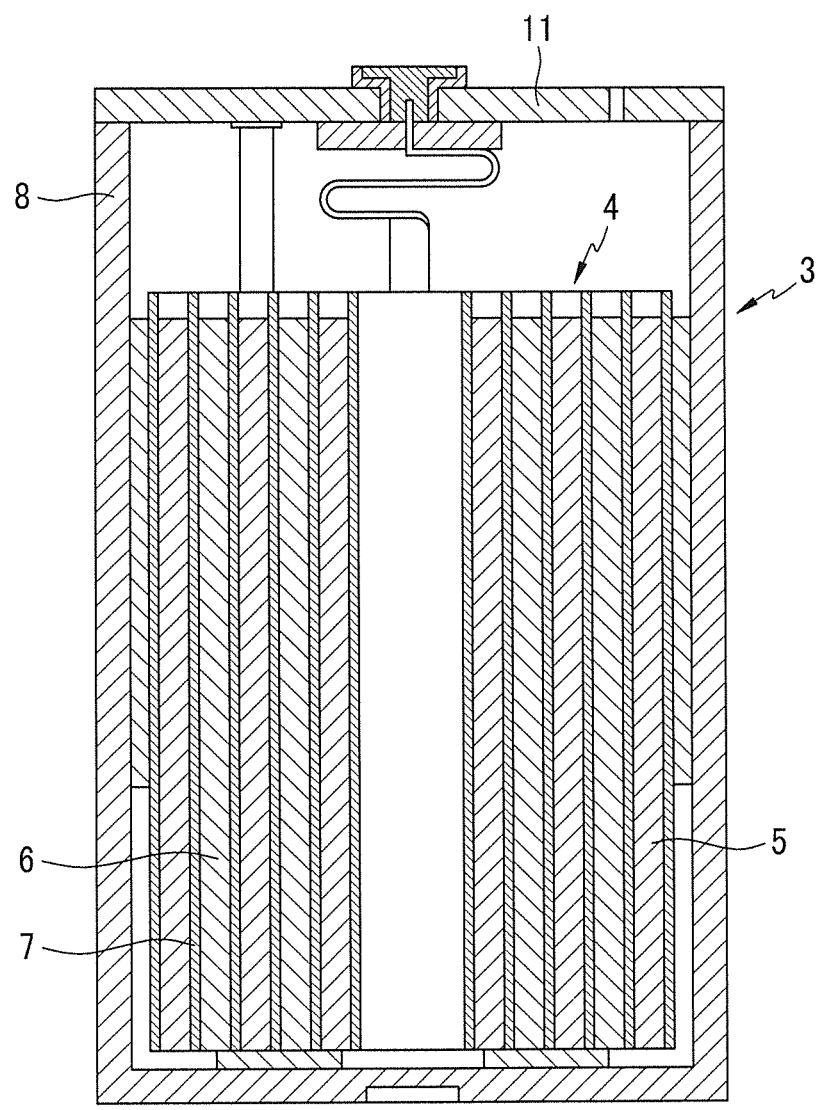
FIG. 1 is a schematic view showing a rechargeable lithium battery according to one embodiment.

An exemplary embodiment of this disclosure will hereinafter be described in detail. However, the embodiment is only exemplary, and this disclosure is not limited thereto.

As used herein, when other specific definition is not otherwise provided, the term "substituted" may refer to one substituted with at least one substituent selected from a fluoro (fluorine) atom, a C1 to C20 alkyl group, a C2 to C20 alkenyl group, a C2 to C20 alkynyl group, a C1 to C20 alkoxy group, a C3 to C30 cycloalkyl group, a C3 to C30 cycloalkenyl group, a C3 to C30 cycloalkynyl group, a C2 to C30 heterocycloalkyl group, a C2 to C30 heterocycloalkenyl group, a C2 to C30 heterocycloalkynyl group, a C6 to C30 aryl group, a C6 to C30 aryloxy group, a C3 to C30 heteroaryl group, an amine group, an ester group, a carboxyl group, a nitro group, or a cyano group.

As used herein, the term "substitution ratio of fluoro" may refer to a percentage the number of fluoro (F) substituting hydrogen (fluorine substituted for hydrogen) relative to the total number of hydrogen in an ether compound including at least one C1 to C6 alkyl group.

According to one embodiment, an electrolyte for a rechargeable lithium battery includes a non-aqueous organic solvent including a fluoro-based solvent and a lithium salt.

The fluoro-based solvent may include a compound represented by the following Chemical Formula 1.

R—O—R'  Chemical Formula 1

In Chemical Formula 1,

R and R' are independently a substituted or unsubstituted C1 to C6 alkyl group, or a substituted or unsubstituted C1 to C6 fluoroalkyl group, wherein at least one of R and R' is the substituted or unsubstituted C1 to C6 fluoroalkyl group.

When the electrolyte includes the fluoro-based solvent, a rechargeable lithium battery may have improved safety.

According to one embodiment of the present invention, the fluoro-based solvent has an adjusted substitution ratio of fluoro and may realize high rate capability and excellent cycle-life characteristic of a rechargeable lithium battery. In the above Chemical Formula 1, the substitution ratio of fluoro in the fluoro-based solvent represented by the Chemical Formula 1 may range from more than about 0% to less than or equal to about 50%. More specifically, the substitution ratio of fluoro may range from more than or equal to about 5% to less than or equal to about 30%, and even more specifically from more than or equal to about 10% to less than or equal to about 20%.

The fluoro-based solvent may include at least one of compounds represented by the following Chemical Formulae 2 to 7.

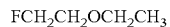 Chemical Formula 2

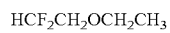 Chemical Formula 3

 Chemical Formula 4

 Chemical Formula 5

 Chemical Formula 6

 Chemical Formula 7

The fluoro-based solvent may be included in an amount of about 15 volume % to about 45 volume %, and specifically about 15 volume % to about 35 volume % based on the total amount of the non-aqueous organic solvent. In one embodiment, when the fluoro-based solvent is included within the above amount, high rate capability and excellent cycle-life characteristics are realized.

The non-aqueous organic solvent may further include a generally-used organic solvent.

The organic solvent may include, for example, a carbonate-based, ester-based, ether-based, ketone-based, alcohol-based, or aprotic solvent and may be any generally-used organic solvent used in an electrolyte of a lithium battery without limitation. The carbonate-based solvent as the organic solvent may include dimethyl carbonate (DMC), diethyl carbonate (DEC), dipropyl carbonate (DPC), methylpropyl carbonate (MPC), ethyipropyl carbonate (EPC), ethylmethyl carbonate (EMC), ethylene carbonate (EC), propylene carbonate (PC), butylene carbonate (BC), or the like. The ester-based solvent as the organic solvent may include methyl acetate, ethyl acetate, n-propyl acetate, dimethylacetate, methylpropinonate, ethylpropinonate, γ-butyrolactone, decanolide, valerolactone, mevalonolactone, caprolactone, or the like. The ether-based solvent as the organic solvent may include dibutyl ether, tetraglyme, diglyme, dimethoxyethane, 2-methyltetrahydrofuran, tetrahydrofuran, or the like. The ketone-based solvent as the organic solvent may include cyclohexanone, or the like. The alcohol-based solvent as the organic solvent may include ethanol, isopropyl alcohol, or the like. The aprotic solvent as the organic solvent may include nitriles (such as R—CN (wherein R is a C2 to C20 linear, branched, or cyclic hydrocarbon, and may include one or more double bonds, one or more aromatic rings, or one or more ether bonds)), amides (such as dimethylformamide or dimethylacetamide), dioxolanes (such as 1,3-dioxolane), sulfolanes, or the like.

The organic solvent may be used singularly or in a mixture. When the organic solvent is used in a mixture, its mixture ratio may be controlled in accordance with desirable performance of a battery. For example, as an organic solvent, ethylenecarbonate (EC), dimethylcarbonate (DMC), and the fluoro-based solvent may be mixed in a volume ratio of about 1.5 to 3.5:about 3.5 to 5.5:about 1.5 to 4.5. As another example, as an organic solvent, ethylenecarbonate (EC), ethylmethylcarbonate (EMC), and the fluoro-based solvent may be mixed in a volume ratio of about 1.5 to 3.5:about 3.5 to 5.5:about 1.5 to 4.5.

The lithium salt is dissolved in the non-aqueous solvent and supplies lithium ions in a rechargeable lithium battery and basically, operates the rechargeable lithium battery and improves transfer of the lithium ions between positive and negative electrodes.

The lithium salt includes one or more supporting salt selected from $LiPF_6$, $LiBF_4$, $LiSbF_6$, $LiAsF_6$, $LiN(SO_2C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato)borate, LiBOB), or a combination thereof.

In one embodiment, the lithium salt may be used in a concentration of about 0.1M to about 2.0M. When the lithium salt is included within the above concentration range, the lithium salt may improve electrolyte performance and lithium ion mobility due to enhanced electrolyte conductivity and viscosity.

The electrolyte may further include a flame retardant.

The flame retardant may be a compound having flame retardancy in an electrolyte of a rechargeable lithium battery.

The flame retardant may include at least one selected from a phosphazene compound and a phosphoric acid ester compound. In one embodiment, the phosphazene compound may be desirable.

The phosphazene compound may include a compound represented by the following Chemical Formula 8.

Chemical Formula 8

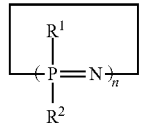

In Chemical Formula 7, n is 3 or 4, $R^1$ and $R^2$ are the same or different and F, $NR^3R^4$, or a substituted or unsubstituted C1 to C5 alkoxy group, $R^3$ and $R^4$ are the same or different and are a substituted or unsubstituted C1 to C30 alkyl group, a substituted or unsubstituted C3 to C30 cycloalkyl group, a substituted or unsubstituted C2 to C30 alkenyl group, or a substituted or unsubstituted C6 to C30 aryl group.

The phosphazene compound may be a compound represented by the following Chemical Formula 9 or the following Chemical Formula 10.

Chemical Formula 9

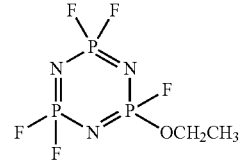

Chemical Formula 10

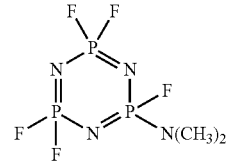

The amount of the flame retardant may be appropriately adjusted depending on kinds of the flame retardant and desired battery characteristics. The flame retardant may be included in an amount of about 1 part by weight to about 20 parts by weight and specifically, about 5 parts by weight to about 10 parts by weight based on 100 parts by weight of the non-aqueous organic solvent. When the flame retardant is used within the range, a rechargeable lithium battery may have excellent flame retardant and safety.

The phosphoric acid ester compound may include at least one selected from trimethyl phosphate, triethyl phosphate, tributyl phosphate, triphenyl phosphate, tricresyl phosphate, trixylenyl phosphate, tris(2,2,2-trifluoroethyl)phosphate, dimethyl(2-methoxyethoxy)methylphsophonate, fluorinated cyclotriphosphazene, and hexamethoxycyclo-phosphazene.

Hereinafter, a rechargeable lithium battery according to another embodiment is described referring to FIG. 1.

FIG. 1 is a schematic view showing a rechargeable lithium battery according to one embodiment.

Referring to FIG. 1, a rechargeable lithium battery 3 according to one embodiment is a cylindrical (can-shape) battery including an electrode assembly 4 including a positive electrode 5, a negative electrode 6, and a separator 7 interposed between the positive and negative electrodes 5 and 6 in a battery case 8, an electrolyte injected from an upper part, and a cap plate 11 sealing the battery. The rechargeable lithium battery according to one embodiment is not limited to a cylindrical or can-shape but may have a prismatic, coin, or pouch shape.

The electrolyte is the same as described above.

The negative electrode includes a negative current collector and a negative active material layer disposed on the negative current collector.

The negative current collector may be a copper foil.

The negative active material layer includes a negative active material, a binder, and optionally, a conductive material.

The negative active material may include a Si-based active material, a carbon-based active material, or a combination thereof. Among these negative active materials, the carbon-based active material is utilized in one embodiment instead of the Si-based active material in terms of high temperature stability. In addition, the carbon-based active material may be mixed with the Si-based active material rather than the carbon-based active material alone. In other words and according to one embodiment, when the electrolyte includes the fluoro-based solvent is applied to a rechargeable lithium battery using the Si-based negative active material, the battery exhibits more improved high temperature stability than the one using the mixture of the Si-based negative active material and the carbon-based negative active material. Furthermore and according to one embodiment, when the electrolyte includes gamma butyrolactone substituted with F in an α-position is applied to a rechargeable lithium battery using the mixture of the Si-based negative active material and the carbon-based negative active material, the battery exhibits more improved high temperature stability than the one using the carbon-based negative active material.

Herein, the Si-based active material has high-capacity and high voltage, and the carbon-based active material has excellent cycle-life characteristic. When the Si-based active material is used with the carbon-based active material, high-capacity, high voltage, and excellent cycle-life characteristics may be all accomplished.

The Si-based active material may include Si, $SiO_x$ (0<x<2), a Si—Y alloy (wherein Y is selected from an alkali metal, an alkaline-earth metal, Group 13 to 16 elements, a transition element, a rare earth element, and a combination thereof, and not Si), $SiO_x$ coated with carbon (0<x<2), a Si—C composite, or a combination thereof.

When the electrolyte including gamma butyrolactone substituted with F in an α-position is applied into a rechargeable lithium battery using the Si-based active material, deterioration of storability at a high temperature due to the Si-based active material may be prevented, and thus a rechargeable lithium battery having high-capacity and high voltage and excellent storability at a high temperature may be realized.

The carbon-based active material may include natural graphite, artificial graphite, soft carbon, hard carbon, a mesophase pitch carbonized product, fired coke, or a combination thereof. The natural graphite or artificial graphite may have non-shaped, sheet, flake, spherical, or fiber shape.

When the electrolyte including gamma butyrolactone substituted with F in an α-position is applied into a rechargeable lithium battery including the carbon-based active material, a rechargeable lithium battery having high-capacity and high voltage and excellent storability at a high temperature may be realized.

When the Si-based active material is mixed with the carbon-based active material, the Si-based active material may be used in an amount of about 1 wt % to about 99 wt %, and the carbon-based active material may be used in an amount of about 1 wt % to about 99 wt %. Specifically, the Si-based active material may be used in an amount of about 10 wt % to about 90 wt %, and the carbon-based active material in an amount of about 10 wt % to about 90 wt %. In one embodiment, when the Si-based active material and the carbon-based active material are used within the ratio range, the rechargeable lithium battery including the active materials has high-capacity and high voltage and excellent storability at a high temperature.

The binder improves binding properties of the negative active material particles to one another and to a current collector, and may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, polyamideimide, polyacrylic acid, or the like, but is not limited thereto.

The conductive material improves electrical conductivity of the negative electrode. Any electrically conductive material may be used as a conductive agent unless it causes a chemical change. Examples of the conductive material include carbon-based material of natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene; or a mixture thereof.

The positive electrode includes a current collector and a positive active material layer disposed on the current collector. The positive active material layer includes a positive active material, a binder, and optionally, a conductive material.

The current collector may be Al (aluminum) but is not limited thereto.

The positive active material includes compounds (lithiated intercalation compounds) that reversibly intercalate and deintercalate lithium ions. Specifically, the positive active material may include a composite oxide including a metal of cobalt, manganese, nickel, or a combination thereof, and lithium, and specific examples of the positive active material may be compounds represented by the following chemical formulae:

$Li_aA_{1-b}B_bD_2$ (0.90≤a≤1.8, and 0≤b≤0.5); $Li_aE_{1-b}B_bO_{2-c}D_c$ (0.90≤a≤1.8, 0≤b≤0.5, 0≤c≤0.05); $LiE_{2-b}B_bO_{4-c}D_c$ (0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (wherein, in the above chemical formula, 0.90≤a≤1.8, 0≤b≤0.5, 0≤C≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds may have a coating layer on the surface or may be mixed with compounds having a coating layer. The coating layer may include at least one coating element compound selected from an oxide of the coating element, a hydroxide of the coating element, an oxyhydroxide of the coating element, an oxycarbonate of the coating element, and a hydroxyl carbonate of the coating element. The compounds for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no negative influence on properties of a positive active material by including these elements in the compound. For example, the method may include any suitable coating method such as spray coating, dipping, or the like, but is not illustrated in more detail, since it is well-known to those who work in the related field.

The binder improves binding properties of the positive active material particles to one another and to a current collector. Examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material improves electrical conductivity of the positive electrode. Any electrically conductive material may be used as a conductive agent unless it causes a chemical change. For example, it may include natural graphite, artificial graphite, carbon black, acetylene black, ketjen black, a carbon fiber, metal powder, metal fiber or the like such as copper, nickel, aluminum, silver or the like, or one or at least one kind mixture of the conductive material such as polyphenylene derivative or the like.

The negative and positive electrodes may be manufactured in a method of mixing the active material, the conductive material, and the binder in a solvent to prepare an active material composition and coating the composition on the current collector.

Such a method of manufacturing a positive electrode is well known and thus, is not described in more detail in the present specification. The solvent may include N-methylpyrrolidone or the like, but is not limited thereto.

The separator may include any suitable materials commonly used in a lithium battery, as long as it separates a negative electrode from a positive electrode and provides a transporting passage for lithium ions. In other words, the separator may have low resistance to ion transportation and an excellent impregnation for an electrolyte. For example, the separator may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

The following examples illustrate the present invention in more detail. These examples, however, should not in any sense be interpreted as limiting the scope of the present invention.

A person having ordinary skill in this art should sufficiently understand parts of the present invention that are not specifically described.

EXAMPLES 1 to 11

A composition for a positive active material layer was prepared by mixing $LiCoO_2$ as a positive active material, polyvinylidene fluoride (PVdF) as a binder, and super-P as a conductive material in a weight ratio of 94:3:3 and dispersing the mixture into N-methyl-2-pyrrolidone. The composition for a positive active material layer was coated on a 12 μm-thick aluminum foil and then, dried and compressed, thereby fabricating a positive electrode.

On the other hand, a composition for a negative active material layer was prepared by mixing SiO coated with carbon as a negative active material and polyamideimide (PAI) as a binder in a weight ratio of 90:10 and dispersing the mixture into N-methyl-2-pyrrolidone. The composition for a negative active material layer was coated on a 12 μm-thick copper foil and then, dried and compressed, thereby fabricating a negative electrode.

As shown in Examples 1 to 11 of the following Table 1, each electrolyte was prepared by mixing ethylene carbonate (EC), dimethyl carbonate (DEC), and a fluoro-based solvent having an adjusted fluoro substitution ratio to prepare a non-aqueous organic solvent, adding $LiPF_6$ in a concentration of 1.3M thereto, and a phosphazene compound represented by the following Chemical Formula 9 as a flame retardant in an amount provided in the following Table 1 based on 100 parts by weight of the non-aqueous organic solvent.

Chemical Formula 9

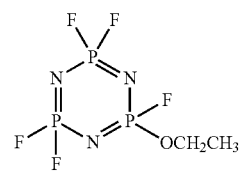

TABLE 1

| Example | Volume ratio of EC/DMC/fluoro-based solvent (substitution ratio of fluoro) | Flame retardant |
|---|---|---|
| Example 1 | 3/5/2 (10%, Chemical Formula 2) | 10 parts by weight |
| Example 2 | 3/5/2 (20%, Chemical Formula 3) | 10 parts by weight |
| Example 3 | 3/5/2 (33%, Chemical Formula 4) | 10 parts by weight |
| Example 4 | 3/5/2 (42%, Chemical Formula 5) | 10 parts by weight |
| Example 5 | 3/5/2 (50%, Chemical Formula 6) | 10 parts by weight |
| Example 6 | 2/4/4 (50%, Chemical Formula 6) | 0 parts by weight |
| Example 7 | 2/4/4 (50%, Chemical Formula 6) | 10 parts by weight |
| Example 8 | 3/4/3 (33%, Chemical Formula 4) | 5 parts by weight |
| Example 9 | 3/4/3 (33%, Chemical Formula 4) | 10 parts by weight |
| Example 10 | 3/4/3 (33%, Chemical Formula 4) | 15 parts by weight |
| Example 11 | 2/4/4 (5%, Chemical Formula 7) | 10 parts by weight |

The positive and negative electrodes, the electrolyte, and a separator of polyethylene/polypropylene/polyethylene films were spirally-wound and compressed in prismatic and cylindrical cans, thereby fabricating a rechargeable lithium battery cell.

COMPARATIVE EXAMPLES 1 TO 5

A rechargeable lithium battery cell was fabricated according to the same method as Example 1 except for adjusting volume ratio of a non-aqueous organic solvent and fluoro substitution ratio of a fluoro-based solvent in the non-aqueous organic solvent to prepare an electrolyte as shown in the following Table 2.

TABLE 2

| Comparative Example | Volume ratio of EC/DMC/fluoro-based solvent (fluoro substitution ratio) | Flame retardant |
|---|---|---|
| Comparative Example1 | 2/8/0 (0%) | 0 part by weight |
| Comparative Example2 | 2/4/4 (60%, Chemical Formula a) | 0 part by weight |
| Comparative Example3 | 2/4/4 (70%, Chemical Formula b) | 0 part by weight |
| Comparative Example4 | 2/4/4 (100%, Chemical Formula c) | 0 part by weight |
| Comparative Example5 | 2/4/4 (100%, Chemical Formula c) | 10 parts by weight |

| | |
|---|---|
| $CF_3CF_2CF_2CH_2OCH_2CH_2CH_2CF_2CF_3$ | Chemical Formula a |
| $CF_3CF_2CF_2CH_2OCH_2CH_2CF_2CF_2CF_3$ | Chemical Formula b |
| $CF_3CF_2CF_2OCF_2CF_3$ | Chemical Formula c |

EVALUATION EXAMPLE

Performance Comparison of Electrolyte

Evaluation Example 1

High Rate Capability of Electrolyte

Each rechargeable lithium battery cell according to Examples 1 to 3 and 6 to 9 and 11 and Comparative Examples 4 and 5 were charged and discharged under the following condition and evaluated regarding high rate capability. The results are provided in FIGS. 2 to 5.

The high rate capability evaluation was performed by charging/discharging the rechargeable lithium battery cells at various C rates (i.e., at 0.2 C/0.2 C, 0.5 C/0.2 C, 0.5 C/1.0 C, and 0.5 C/2.0 C) respectively as one cycle. Herein, the upper charge voltage limit was 4.2V, and the discharge ending voltage was 2.8V.

Figure 2:
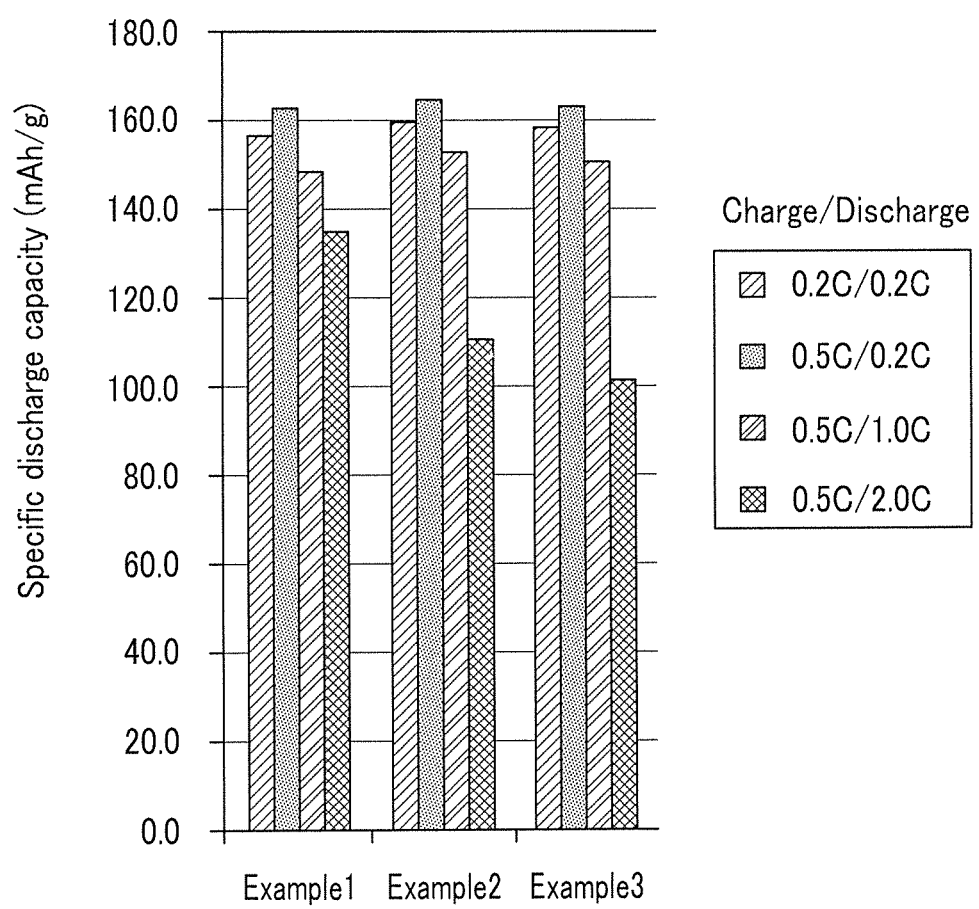
FIG. 2 is a graph showing specific discharge capacity of rechargeable lithium battery cells according to Examples 1 to 3.

FIG. 2 is a graph showing specific discharge capacity of the rechargeable lithium battery cells according to Examples 1 to 3.

Referring to FIG. 2, the rechargeable lithium battery cells according to Examples 1 to 3 maintained high specific discharge capacity and had excellent high-rate cycle-life characteristics.

Figure 3:
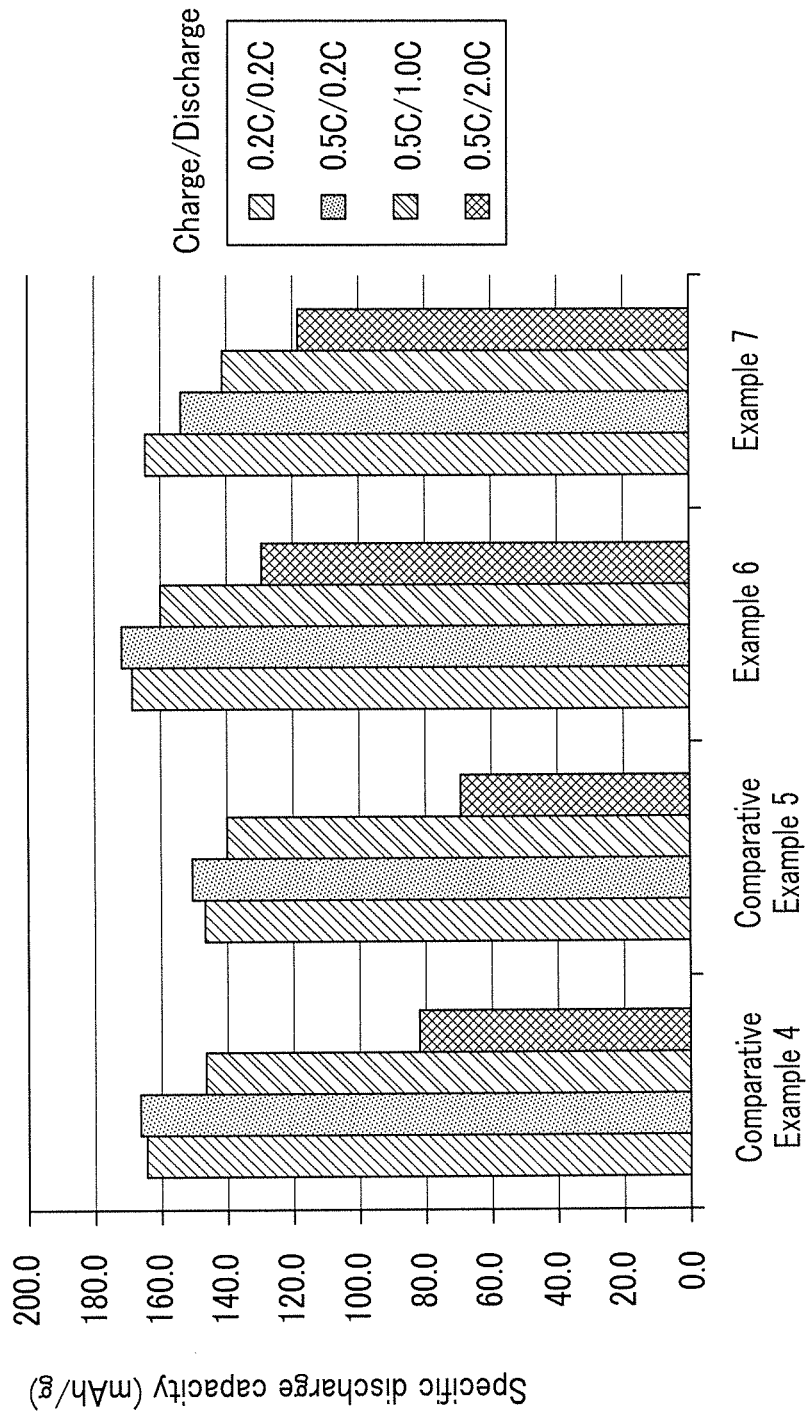
FIG. 3 is a graph showing specific discharge capacity of rechargeable lithium battery cells according to Examples 6 and 7 and Comparative Examples 4 and 5.

FIG. 3 is a graph showing specific discharge capacity of the rechargeable lithium battery cells according to Examples 6 and 7 and Comparative Examples 4 and 5.

Referring to FIG. 3, the rechargeable lithium battery cells according to Examples 6 and 7 maintained higher specific discharge capacities than the ones according to Comparative Examples 4 and 5 and thus, had excellent high rate cycle-life characteristics.

Figure 4:
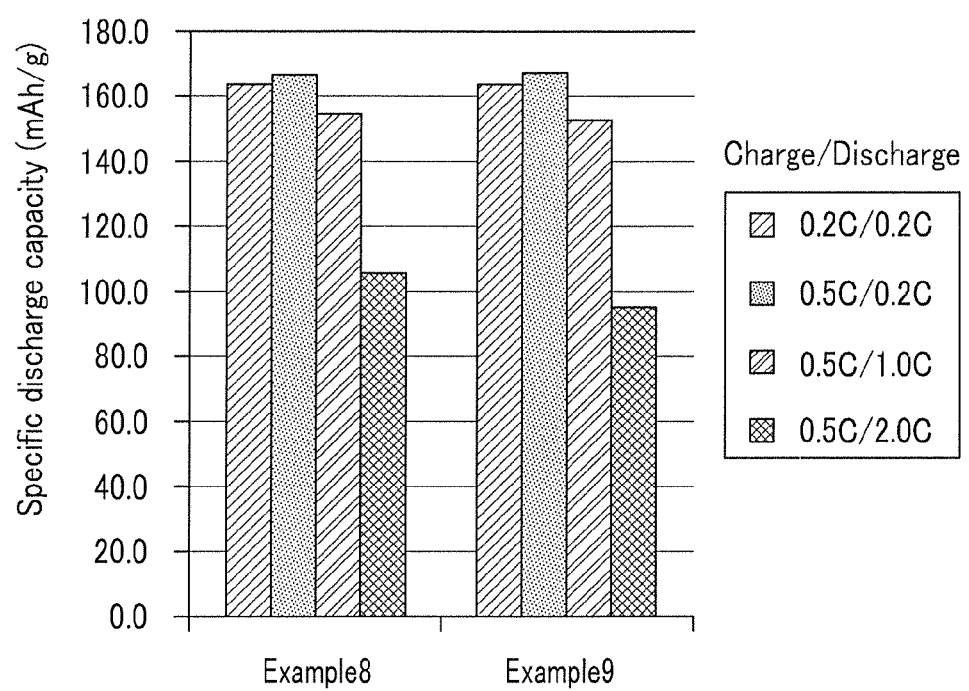
FIG. 4 is a graph showing specific discharge capacity of rechargeable lithium battery cells according to Examples 8 and 9.

FIG. 4 is a graph showing specific discharge capacity of the rechargeable lithium battery cells according to Examples 8 and 9.

Referring to FIG. 4, the rechargeable lithium battery cell according to Example 8 including a flame retardant in a relatively small amount had higher specific discharge capacity than the rechargeable lithium battery cell according to Example 9 including the flame retardant in a relatively large amount so that it can be shown from the result that the rechargeable lithium battery cell with a small amount of the flame retardant had a better high-rate cycle-life characteristic than that with a large amount of the flame retardant.

Figure 5:
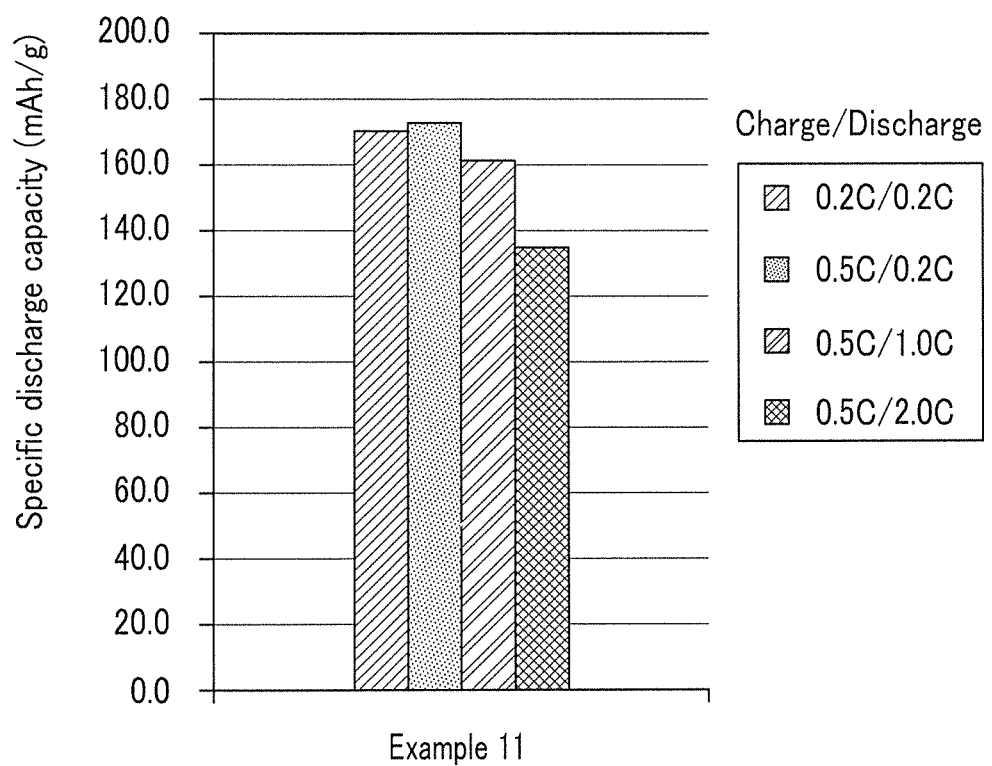
FIG. 5 is a graph showing specific discharge capacity of a rechargeable lithium battery according to Example 11.

FIG. 5 is a graph showing specific discharge capacity of the rechargeable lithium battery cell according to Example 11.

Referring to FIG. 5, the rechargeable lithium battery cell according to Example 11 maintained high specific discharge capacity and excellent high-rate cycle-life characteristics.

Evaluation Example 2

Cycle-life Characteristic of Electrolyte

The rechargeable lithium battery cells according to Examples 1 to 4, 6 to 11 and Comparative Examples 2 to 5 were charged and discharged under the following conditions and evaluated regarding cycle-life characteristics. The results are provided in FIGS. 6 to 10.

The cycle-life characteristic was evaluated by repeatedly charging and discharging the battery cells at 1 C and 4.2 V of a charge potential (0.05 C cut-off) and 2.8 V of a discharge potential for 100 cycles and then measuring capacity retention for about 100 cycles.

Figure 6:
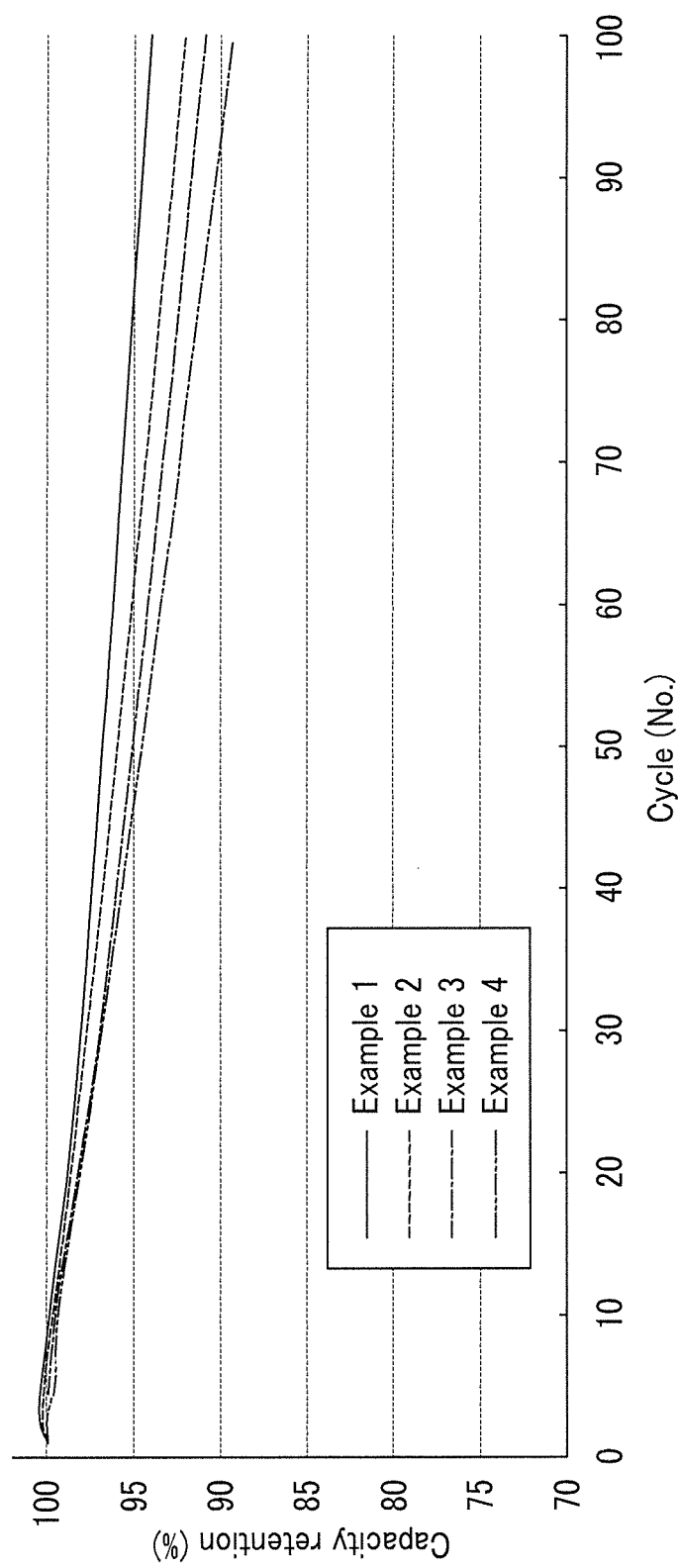
FIG. 6 is a graph showing capacity retention of the rechargeable lithium battery cells according to Examples 1 to 4 depending on cycles.

FIG. 6 is a graph showing capacity retention of the rechargeable lithium battery cells according to Examples 1 to 4 depending on cycles.

Referring to FIG. 6, the rechargeable lithium battery cells according to Examples 1 to 4 had smoothly decreased (not sharply decreased) capacity retention and thus, excellent cycle-life characteristics.

Figure 7:
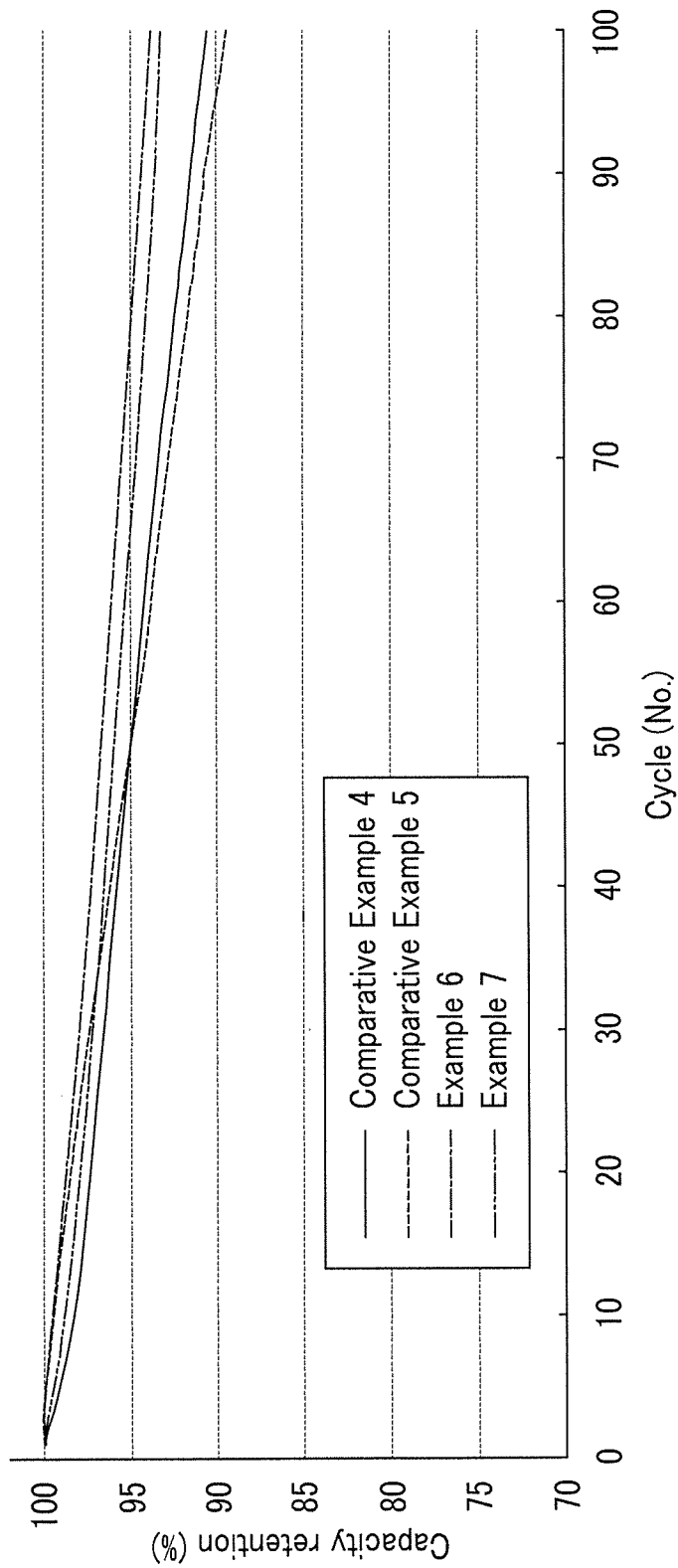
FIG. 7 is a graph showing capacity retention of the rechargeable lithium battery cells according to Examples 6 and 7 and Comparative Examples 4 and 5 depending on cycles.

FIG. 7 is a graph showing capacity retention of the rechargeable lithium battery cells according to Examples 6 and 7 and Comparative Examples 4 and 5 depending on cycles.

Referring to FIG. 7, the rechargeable lithium battery cells according to Examples 6 and 7 had more smoothly decreased capacity retention than the ones according to Comparative Examples 4 and 5 and thus, more excellent cycle-life characteristics.

Figure 8:
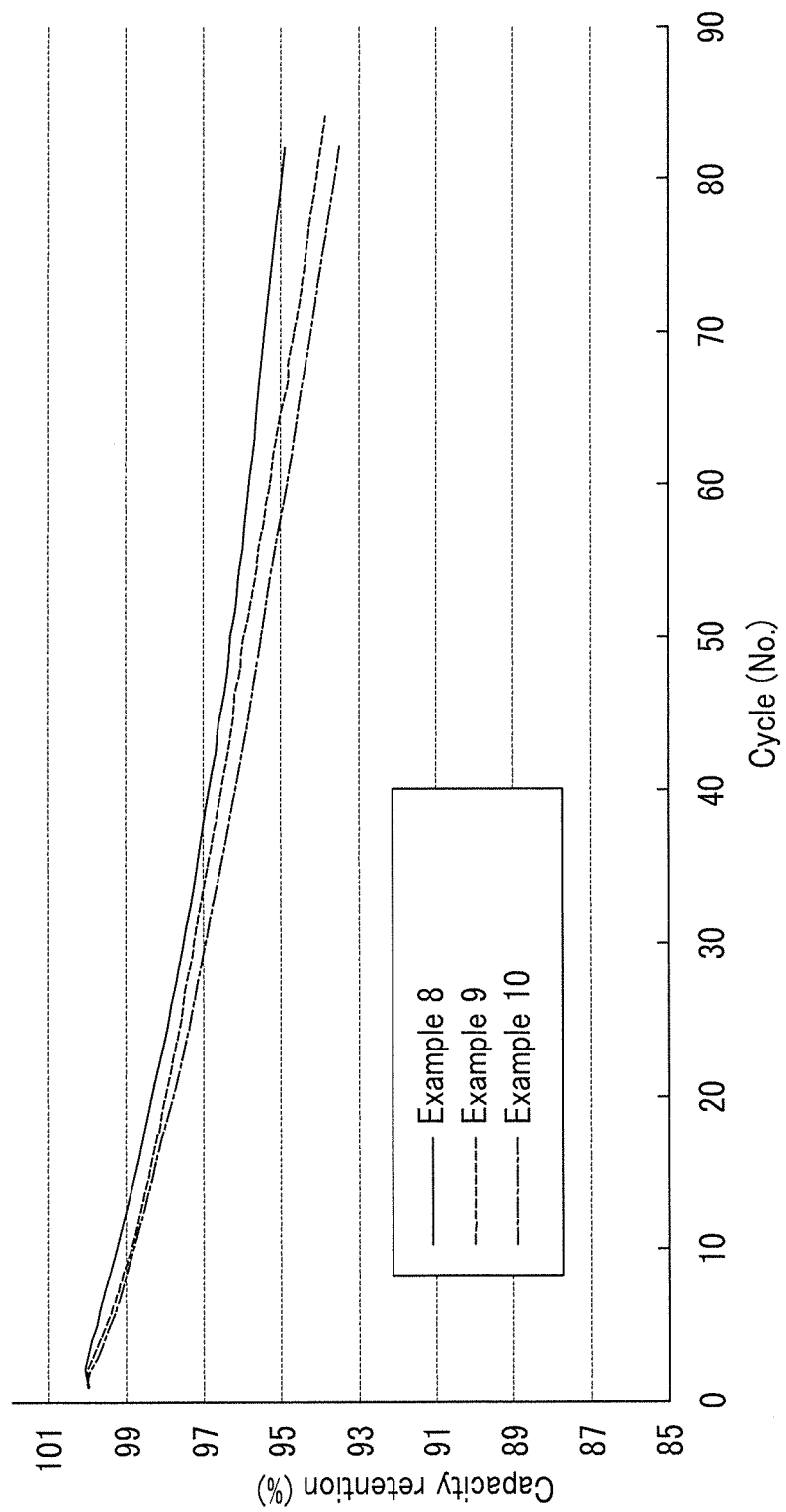
FIG. 8 is a graph showing capacity retention of the rechargeable lithium battery cells according to Examples 8 to 10 depending on cycles.

FIG. 8 is a graph showing capacity retention of the rechargeable lithium battery cells according to Examples 8 to 10 depending on cycles.

Referring to FIG. 8, the rechargeable lithium battery including a flame retardant in a relatively small amount according to Example 8 had more smoothly decreased capacity retention than the one including a flame retardant in a relatively large amount according to Example 10 so that it had excellent cycle-life characteristic.

Figure 9:
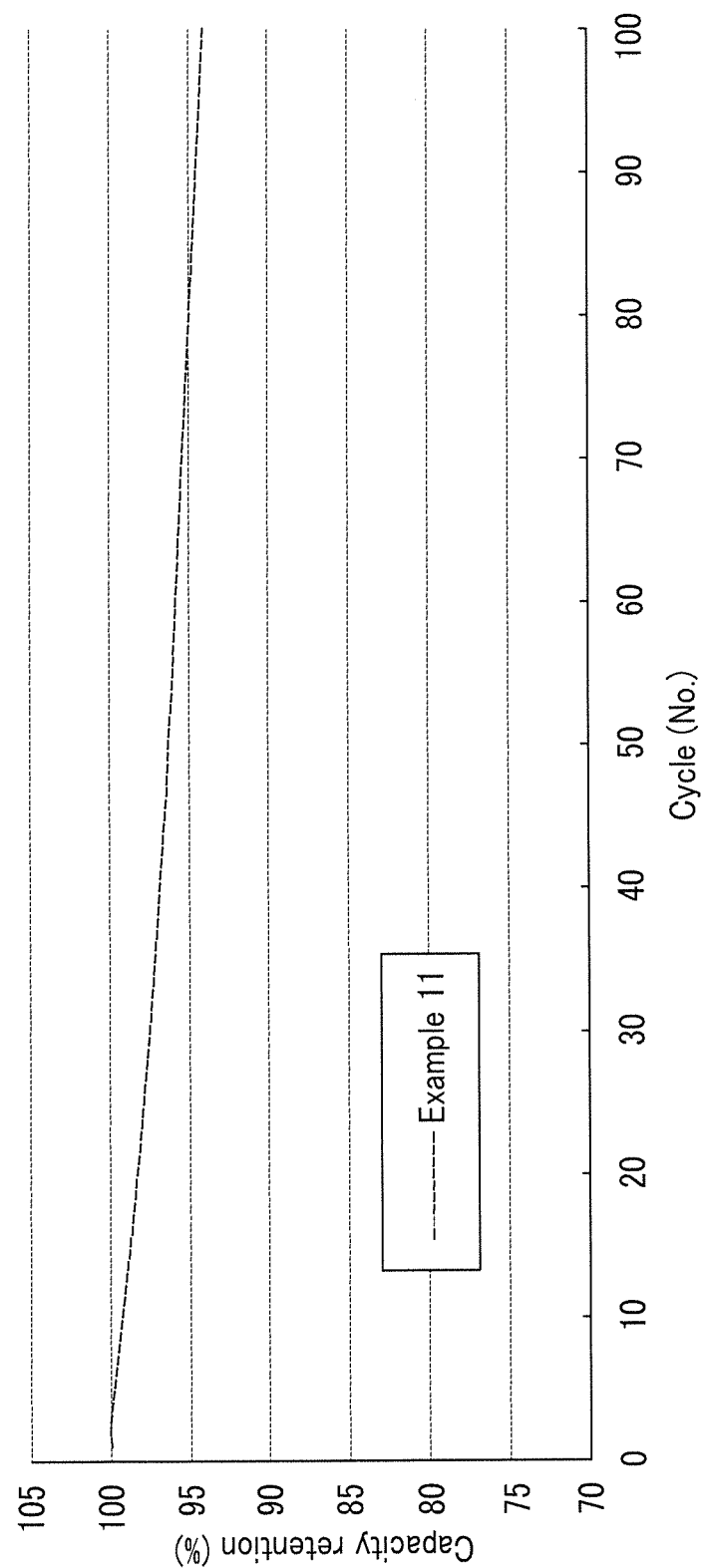
FIG. 9 is a graph showing capacity retention of the rechargeable lithium battery according to Example 11 depending on cycles.

FIG. 9 is a graph showing capacity retention of the rechargeable lithium battery according to Example 11 depending on cycles.

Referring to FIG. 9, the rechargeable lithium battery cell according to Example 11 had smoothly decreased capacity retention and thus, excellent cycle-life characteristics.

Figure 10:
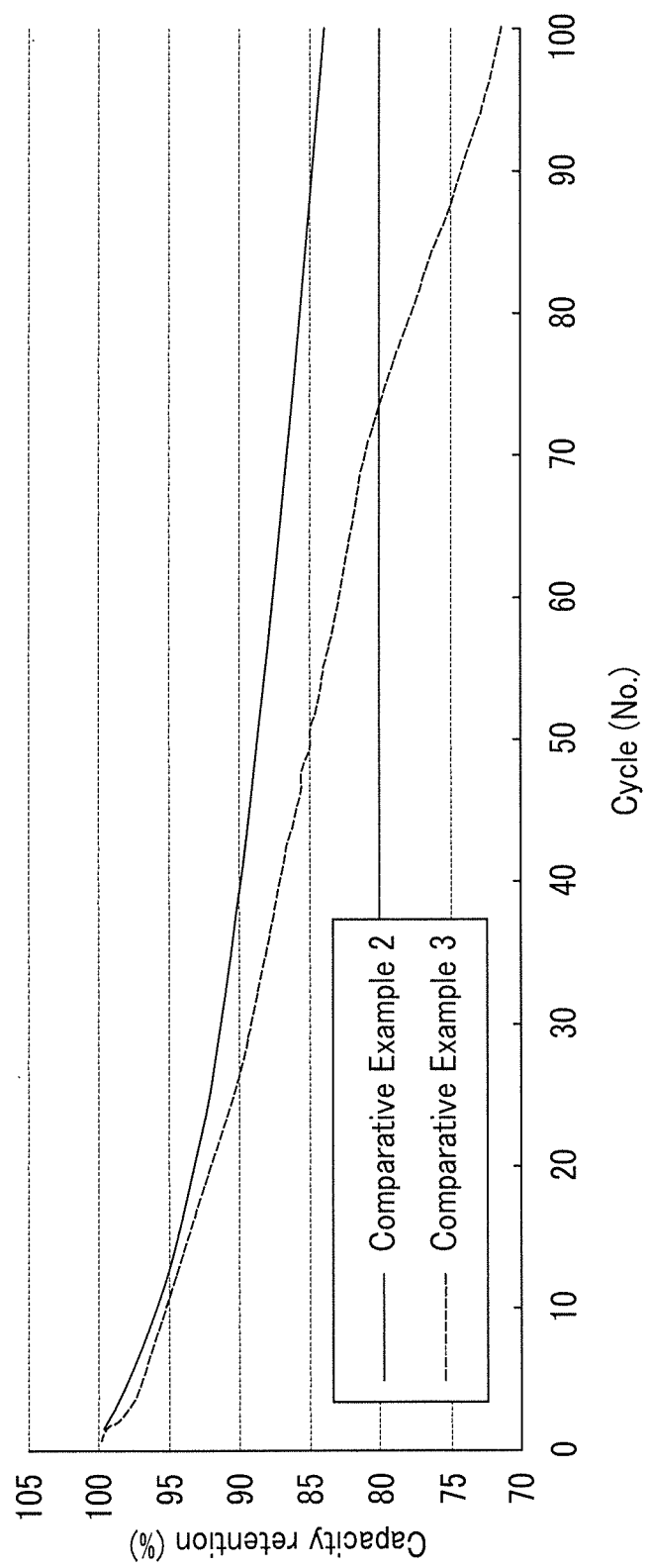
FIG. 10 is a graph showing capacity retention of the rechargeable lithium battery cells according to Comparative Examples 2 and 3 depending on cycles.

FIG. 10 is a graph showing capacity retention of the rechargeable lithium battery cells according to Comparative Examples 2 and 3 depending on cycles.

Referring to FIG. 10, the rechargeable lithium battery cells according to Comparative Examples 2 and 3 had sharply decreased capacity retention and thus, deteriorated cycle-life characteristics.

Evaluation Example 3

Safety of Battery Cell Including Electrolyte

The rechargeable lithium battery cells according to Examples 1 to 11 and Comparative Example 1 were experimented under the following conditions to evaluate safety. The results are provided in FIGS. 11 and 12.

The safety evaluation was performed by penetrating a circular cell in the center with a nail having a diameter of 2.5 mm at a speed of 80 mm/s.

The penetration degree was classified into 5 steps of L1 to L5. In other words, the most stable step was L1, and the least stable was L5.

Figure 11:
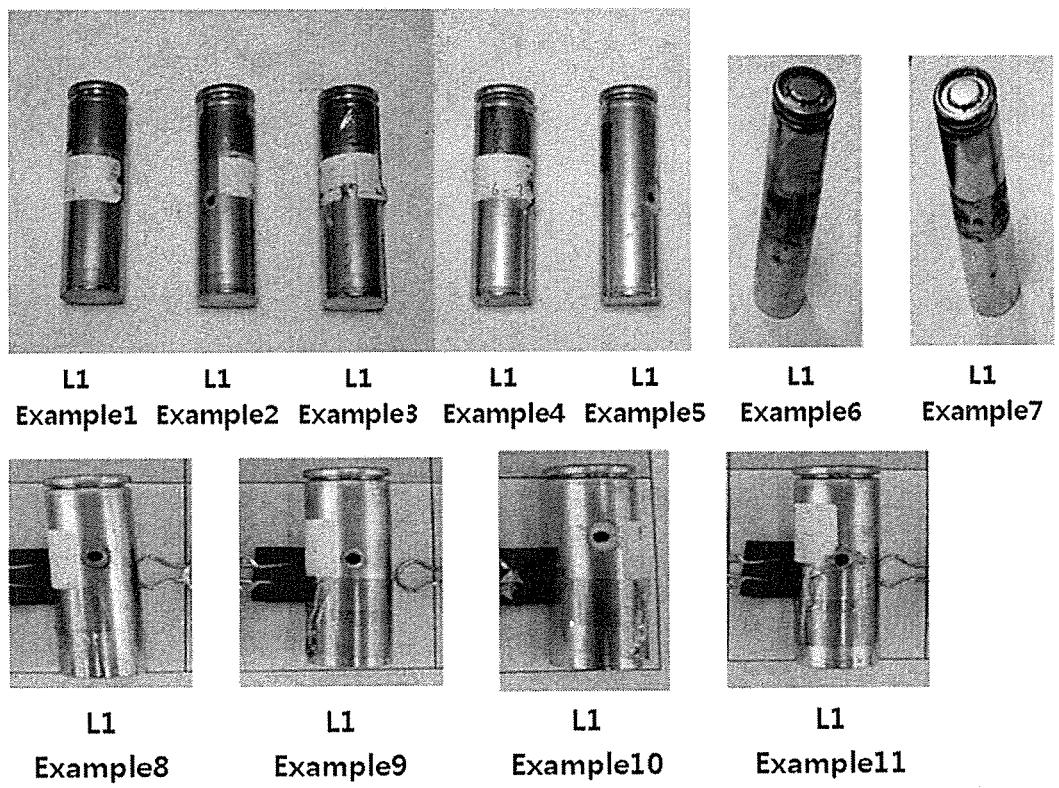
FIG. 11 is a photograph showing penetration safety of the rechargeable lithium battery cells according to Examples 1 to 11.

FIG. 11 is a photograph showing penetration safety results of the rechargeable lithium battery cells according to Examples 1 to 11.

Referring to FIG. 11, the rechargeable lithium battery cells according to Examples 1 to 11 all had L1 safety and thus, excellent safety.

Figure 12:
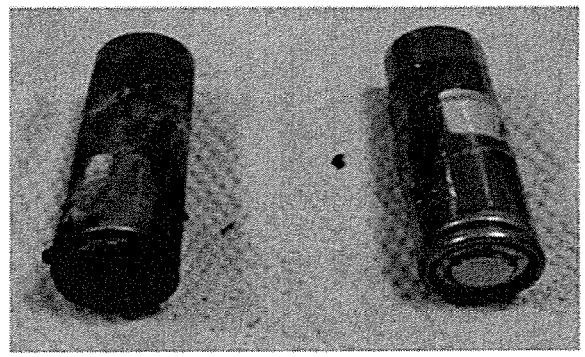
FIG. 12 is a photograph showing penetration safety of the rechargeable lithium battery cells according to Example 5 and Comparative Example 1.

FIG. 12 is a photograph showing penetration safety of the rechargeable lithium battery cells according to Example 5 and Comparative Example 1.

Referring to FIG. 12, the rechargeable lithium battery cell according to Example 5 had L1, while the one according to Comparative Example 1 had L5 and thus, better safety than the one according to Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrolyte for a rechargeable lithium battery, comprising:
    a lithium salt; and
    a non-aqueous organic solvent,
    wherein the non-aqueous organic solvent comprises a flame retardant, and a fluoro-based solvent selected from at least one compound represented by the following Chemical Formula 3 to 7:

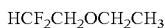   Chemical Formula 3

HCF$_2$CH$_2$OCH$_2$CH$_3$

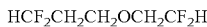   Chemical Formula 4

HCF$_2$CH$_2$CH$_2$OCH$_2$CF$_2$H

   Chemical Formula 5

F$_3$CCH$_2$CH$_2$OCH$_2$CF$_2$H

   Chemical Formula 6

HCF$_2$CF$_2$CH$_2$OCH$_2$CF$_2$H

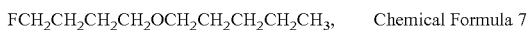   Chemical Formula 7

FCH$_2$CH$_2$CH$_2$CH$_2$OCH$_2$CH$_2$CH$_2$CH$_3$, wherein the flame retardant comprises a phosphazene compound and the fluoro-based solvent is included in an amount of about 15 volume % to about 45 volume % based on the total amount of the non-aqueous organic solvent.

2. The electrolyte of claim 1, wherein the substitution ratio of fluoro in the fluoro-based solvent is in a range from more than or equal to about 5% to less than or equal to about 30%.

3. The electrolyte of claim 1, wherein the substitution ratio of fluoro in the fluoro-based solvent is in a range from more than or equal to about 10% to less than or equal to about 20%.

4. The electrolyte of claim 1, wherein
the phosphazene compound comprises a compound represented by the following Chemical Formula 8:

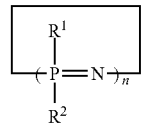

Chemical Formula 8 wherein, n is 3 or 4, R$^1$ and R$^2$ are the same or different and are each F, NR$^3$R$^4$, or a substituted or unsubstituted C1 to C5 alkoxy group, and R$^3$ and R$^4$ are the same or different and are each a fluorine substituted or unsubstituted C1 to C30 alkyl group, a fluorine substituted or unsubstituted C3 to C30 cycloalkyl group, a fluorine substituted or unsubstituted C2 to C30 alkenyl group, or a fluorine substituted or unsubstituted C6 to C30 aryl group.

5. The electrolyte of claim 1, wherein the phosphazene compound is a compound represented by the following Chemical Formula 9 or the following Chemical Formula 10:

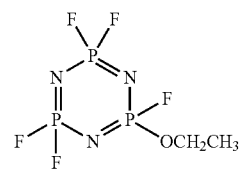

Chemical Formula 9

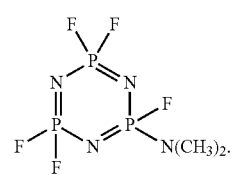

Chemical Formula 10

6. The electrolyte of claim 1, wherein the flame retardant is included in an amount of about 1 part by weight to about 20 parts by weight based on 100 parts by weight of the non-aqueous organic solvent.

7. The electrolyte of claim 1, wherein the flame retardant is included in an amount of about 5 parts by weight to about 10 parts by weight based on 100 parts by weight of the non-aqueous organic solvent.

8. A rechargeable lithium battery, comprising
the electrolyte of claim 1;
a positive electrode including a positive active material; and
a negative electrode including a negative active material.

9. The rechargeable lithium battery of claim 8, wherein the substitution ratio of fluoro in the fluoro-based solvent is in a range from more than or equal to about 5% to less than or equal to about 30%.

10. The rechargeable lithium battery of claim 8, wherein
the phosphazene compound comprises a compound represented by the following Chemical Formula 8:

Chemical Formula 8

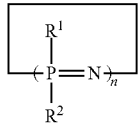

wherein, n is 3 or 4, $R^1$ and $R^2$ are the same or different and are each F, $NR^3R^4$, or a substituted or unsubstituted C1 to C5 alkoxy group, and $R^3$ and $R^4$ are the same or different and are each a fluorine substituted or unsubstituted C1 to C30 alkyl group, a fluorine substituted or unsubstituted C3 to C30 cycloalkyl group, a fluorine substituted or unsubstituted C2 to C30 alkenyl group, or a substituted or unsubstituted C6 to C30 aryl group.

11. The rechargeable lithium battery of claim 8, wherein the flame retardant is included in an amount of about 1 part by weight to about 20 parts by weight based on 100 parts by weight of the non-aqueous organic solvent.

* * * * *